Sept. 9, 1952          K. C. SIMPSON          2,609,634
BOBBER
Filed June 23, 1950
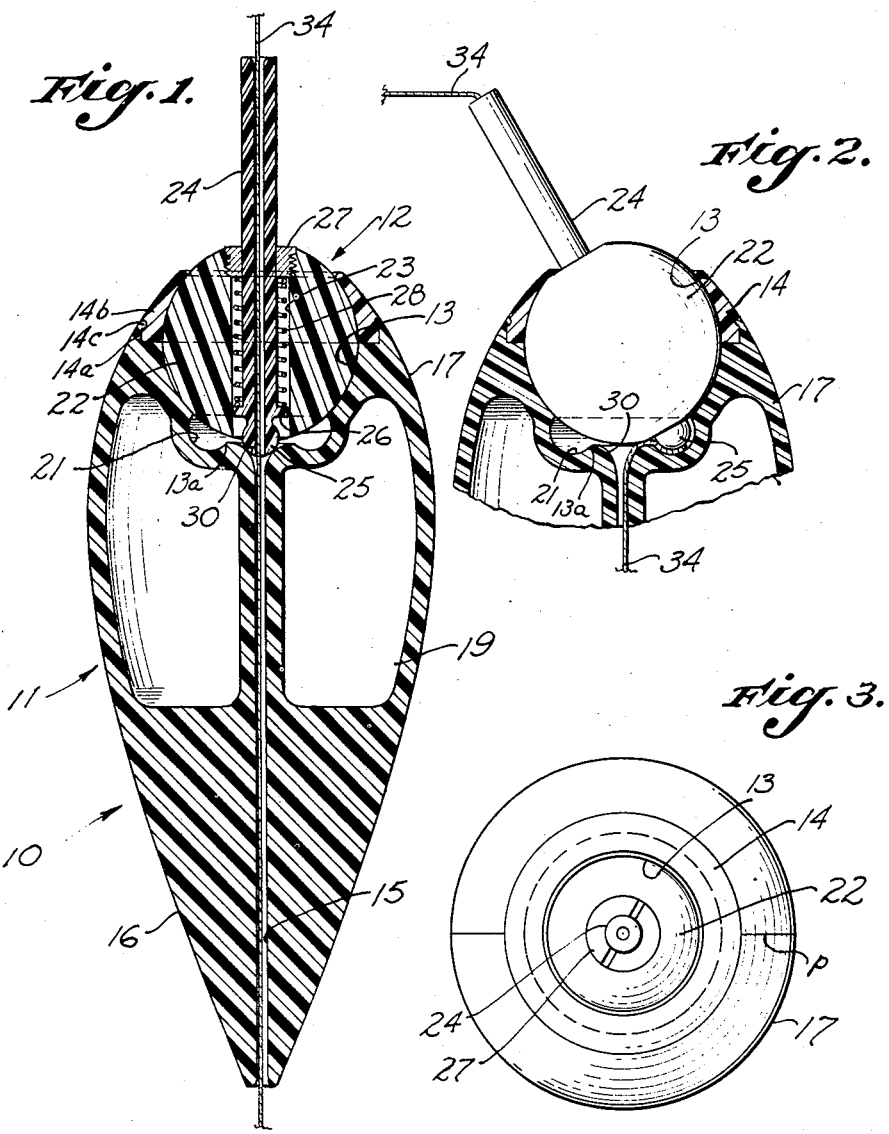
KENNETH C. SIMPSON
INVENTOR.
BY *Forrest Lilly*
ATTORNEY.

Patented Sept. 9, 1952

2,609,634

UNITED STATES PATENT OFFICE 2,609,634

BOBBER

Kenneth C. Simpson, Pasadena, Calif.

Application June 23, 1950, Serial No. 169,907

7 Claims. (Cl. 43—44.88)

This invention relates to fishing bobbers and more particularly relates to a fishing bobber with relation to which the fishing line may run freely or to which the line may be secured in fixed position.

The bobber of this invention has a clutch which, when engaged, prevents the free running of the bobber on the line. The clutch may be operated from the anglers' position by line tension to fix the position of the bobber on the line, or, after a fish is hooked, to free it thereon and allow it and the bobber to run free relative to each other.

In one form of angling it is usual to attach a baited hook, a weight, and a bobber to the fishing line at fixed positions therealong. The distance on the fishing line from the baited hook to the fixed bobber is usually too great to permit the angler to cast the line with a modern short casting rod equipped with a line reel. It is desirable therefore to have a bobber which may be positioned adjacent to the sinker or hook for the cast, and can be secured in a fixed position at the will of the fisherman after the cast is made.

Furthermore, when the bobber is fixedly attached to the line, the length of line between the fixed bobber and hook may prevent reeling the fish in close enough to the end of the pole to make easy the landing operation. Also, the bobber will offer some resistance when the line is drawn through the water when a fish is being drawn in, and this resistance, in addition to the pull of the fish, may interfere with the proper playing of the fish. It is thus an advantage to have the bobber loose on the line after the fish has taken the bait.

It is an object of the invention to provide an improved fishing bobber.

It is another object of the invention to provide a fishing bobber which is at times fixed to a fishing line and at times free to move on the line.

It is another object of the invention to provide a fishing bobber which may be secured on a fishing line at varying distances from a baited hook, at the selection of the fisherman, either before or after the line is cast.

It is another object of the invention to provide a free running fishing bobber having a fishing line gripping arrangement which is operable from an angler's position to bind the bobber on the line, and which is subsequently operable by the angler, after a fish has struck, to release it to run free on the line.

These and other objects of the invention will become apparent from the following description of a preferred embodiment thereof, and from the drawing illustrating the same in which:

Figure 1 is a medial longitudinal section through the bobber showing the parts in that position in which the fishing line can run freely through the bobber;

Figure 2 is a view of an upper portion only of the bobber, partly in section, showing the parts in that position in which the fishing line is bound within the bobber, fixing the position of the bobber on the line; and Figure 3 is a top view of the bobber.

Referring to the drawing and particularly to Figure 1, the numeral 10 designates a fishing bobber having a buoyant float 11, typically molded from a suitable plastic material, and a ball and socket clutch 12. The ball of clutch 12 may be retained within rounded socket 13 formed in the upper end of the float 11. As here shown, the upper end of the float includes a separate or detachable retainer ring 14, also of plastic, whose inside surface defines the upper end portion of socket 13, and whose lower end is removably seated in a countersink 14a in the upper end of the body of float 11. Ring 14 has an annular groove 14b for reception of an inwardly projecting lip portion 14c on the float, and the latter is readily sprung outwardly to permit assembly or disassembly of the ring and float body.

The buoyant float 11 is provided with an axial line receiving bore 15 leading from its lower end to the rounded socket 13. In practice, this float body is preferably molded in two identical longitudinal halves, which are subsequently joined together along a meeting plane, as indicated at p in Figure 3. The two halves of the float body enclose a buoyancy chamber 19. The socket 13 of the float 11 is formed, concentrically with bore 15, and spaced a short distance outside the latter, with an annular groove 21, of rounded contour. The bore 15 has a curvilinear flare 30 at its end adjacent the socket 13 to form a juncture 13a with the inner edge of the aforementioned groove 21. The flare 30 at the upper end of bore 15 thus forms a depression or seat for a later described detent member.

The ball clutch assembly 12 consists of a ball 22, also preferably of plastic, having a diametrical bore 23, and a tubular stem 24 extends through said bore from the lower surface of the ball to a level preferably well above the upper surface of the ball. The lower end of the tubular stem 24 has a ball shaped detent head 25, and above this head the stem 24 is provided with a laterally extending annular flange 26.

The tubular stem 24 is alined within the bore 23 of the ball 22 by means of the flange 26 at one end of the bore 23, and at the other end thereof illustratively by a ring nut 27, which threadedly engages the ball 22. The ring nut 27 also serves to retain a coiled spring 28 in adjusted compression against the flange 26, so as to urge the lower end 25 of the stem 24 in a downward direction.

As shown in Figure 1, a fishing line 34 is threaded through the tubular stem 24 and the axial bore 15, and in usual practice the end of the fishing line is provided at a suitable distance beyond the pointed end of the float 11 with a baited hook or other lure, and is suitably weighted if necessary.

With the baited hook, the sinker, and the bobber on the line, the bobber being run down adjacent the hook, and its parts being in the unclutched position shown in Figure 1, the line is cast by the angler. After the parts land on the water, the bobber will float and the weight and baited hook will sink, since the parts of the bobber are alined so that the line can run out through the tubular stem 24 of the clutch 12 and the axial bore 15 of the float 11. This alinement is maintained by the action of the spring 28, which holds the detent head 25 in the seat 30. It is essential that the bobber shall normally float in a substantially upright position, rather than horizontally or in a "head down" position. This is necessary so the operator of the float will be able to trip the gripping mechanism in the top of the bobber by jerking on the line, as presently described. In order to insure that the bobber shall normally be maintained in a substantially upright position in the water or substantially that of Figure 1 of the drawing, it is necessary that the center of gravity of the bobber be disposed in the lower portion of the body or that of the pointed end, and, in the present embodiment, this has been accomplished by making this end portion of the bobber solid, as shown.

The line can now be pulled upwardly through, or can be allowed to pay out and through the float 11 and the clutch 12, until the baited hook or other lure reaches a desired distance from the surface of the water and the bobber.

At this point the angler can give a sharp jerk on the line and the clutch 12 will be operated thereby to bind the line within the bobber, so that the bait or other lure will be suspended the desired distance from the surface of the water and the bobber.

Describing the performance of the clutch in more detail, when the angler jerks on the line 34 the tubular stem 24 is displaced to an angular position with respect to the axis of the float 11, as shown in Figure 2, the inertia of the float in the water being sufficient to permit this action. In this operation, the ball 22 is rotated in the socket 13, and the head 25 of the tubular stem 24 leaves the seat 30 against the yielding resistance of spring 23 and rides into and lodges in the annular groove 21, carrying with it the line 28 which is clamped between it and the wall of the groove. As shown in Figure 2, this binds the line and prevents its free running through the clutch 12. By means of the nut 27, the compressive force of the spring 28 may be varied, which varies the force of pull on the line 34 required to unseat the head 25 from the seat 30.

Upon the fish taking the baited hook, a certain degree of added tension is applied to the line 34 below the bobber 10. This tension is however insufficient to release the clutch, but is felt by the angler through the still engaged bobber. At the proper time the angler pulls back on the line in the normal way so as to set the hook, and upon this occurrence, the tension in the line becomes sufficient to disengage the clutch of the bobber, so that the latter is freed to run down on the line toward the fish. Specifically, the tautened line tends to straighten, from the upper end of the stem 24 to the bottom end of the bobber, and when the tension becomes sufficient, the stem 24 will be elevated slightly against the resistance of spring 28 as the detent head 25 rides back out of the groove 21 toward its central seat 30. The stem 24 thus returns to its original position alined with the bore 15, and the spring 28 forces it and its head 25 back to the initial position of Figure 1, where the line 34 is again free to run through the bobber. The fisherman, by keeping the line tight, will prevent the bobber from again clutching the line as the fish is played and after the fish has been pulled up close to the bobber the fish may be further played and landed without interference of the bobber.

The buoyant float portion 11 of the bobber 10 is shown in the drawing as a hollow body formed by joining two molded pieces.

From the foregoing it will be seen that I have provided an improved fishing bobber which is fully suitable to accomplish all the objects hereinbefore set forth.

While I have shown and described a preferred form of my invention, it will be apparent that modifications may be made therein without departing from the broad features mentioned herein. Consequently, I do not wish to be restricted to the particular form or arrangement of parts herein described and shown, except as limited by my claims.

I claim:

1. A fishing bobber having upper and lower parts, each part having a straight line guide means for freely receiving the fishing line, said parts being relatively movable to aline said two guide means along a straight line or to relatively angle said two guide means, the two parts being shaped to clamp the line therebetween when in relatively angled position, and to release the line for free relative movement of the float and line when the two parts are in alined position, means on one of said parts engageable with the other part to exert a yielding restraint against relative movement therebetween, said parts being operable to move from said alined position to said angled position upon jerking the line from above when the bobber is floating, and being operable to move from said angled position to said alined position upon exertion of a predetermined tension in the line exerted from points above and below the bobber.

2. A fishing bobber comprising: a float having an upwardly open spherical socket at its upper end and also having a central vertical bore for the threading of the fishing line therethrough, said bore opening centrally in the bottom of said spherical socket, there being a circular groove formed in the surface of the spherical socket surrounding the upper end of said bore; a detent seat at the upper end of said bore in said float; a ball seated in said socket, said ball having a diametrical bore; a tubular stem slidably mounted in said ball bore and projecting outwardly from the upper end of said bore and formed with a detent head at the lower end; a coiled spring surrounding said stem seated within said ball bore and arranged to engage said stem to urge said stem downwardly to seat said detent head alternatively in the upper end of said float bore or in said circular groove, the stem having a central vertical bore which is in alinement with the central vertical bore of the float when the detent head at the lower end of the stem is seated in the upper end of the float bore for free running of the fishing line through the float and ball, and which is at an angle to the central bore of the float when the detent head of the stem is seated in the said circular groove, whereby the line is frictionally bound between the head of the stem and the bottom surface of the circular groove.

3. A fishing bobber as defined in claim 2, wherein said bore in said float flares outwardly at its upper end to form a seat for said detent head.

4. A fishing bobber comprising: a float having an upwardly open spherical socket at its upper end and also having a central vertical bore for the threading of the fishing line therethrough, said bore opening centrally in the bottom of said spherical socket, there being a circular groove formed in the surface of the spherical socket surrounding the upper end of said bore; a detent seat at the upper end of said bore in said float; a ball seated in said socket, said ball having a diametrical bore; a tubular stem slidably mounted in said ball bore and projecting outwardly from the upper end of said bore and formed with a detent head at the lower end; spring means urging said tubular stem to move in said ball bore toward the surface of said spherical socket, whereby to yieldingly engage said detent head with the detent seat at the upper end of said float bore, or with said annular groove; a coiled spring surrounding said stem seated within said ball bore and arranged to engage said stem to urge said stem downwardly to seat said detent head alternatively in the upper end of said float bore or in said circular groove, the stem having a central vertical bore which is in alinement with the central vertical bore of the float when the detent head at the lower end of the stem is seated in the upper end of the float bore for free running of the fishing line through the float and ball, and which is at an angle to the central bore of the float when the detent head of the stem is seated in the said circular groove, whereby the line is frictionally bound between the head of the stem and the bottom surface of the circular groove.

5. In a bobber, the combination of: a float body having a vertical line passage, a tubular stem mounted for universal movement in the upper portion of said float, said tubular stem projecting upwardly from the upper end of said bobber, and receiving and guiding the fishing line to said line passage in said float, spring pressed detent means releasably holding said stem either in a position alined with said line passage or in an angled position relative thereto, and means operable by movement of said stem to said angled position for binding said line against free running through said stem and line passage, said line being released for free movement relative to the bobber when said tubular stem is alined with said line passage in said float body.

6. A fishing bobber adapted to run freely on a fishing line comprising in combination: a buoyant body portion and a ball clutch; said buoyant body portion having an axial bore and a socket with a circular groove in the lower portion thereof surrounding the upper end of said axial bore; said ball clutch consisting of a ball having a diametrical bore; a tubular stem slidably mounted in said ball bore, said stem having a laterally extending annular flange and a rounded lower end portion; said fishing line passing through said tubular stem and axial bore; a spring in said ball bore surrounding said tubular stem; a shoulder in said ball bore seating the upper end of said spring, said spring acting under compression between said shoulder and said flange, said ball clutch being retained within said socket in said body portion for ball-and-socket movement therein, and said ball clutch and buoyant body portion being formed and related to provide for a spring detent action of said rounded lower end seating alternatively in the upper end of said axial bore or said circular groove said fishing line being freely movable through said tubular stem and axial bore when said rounded lower end of the stem is seated in the upper end of said axial bore, and being constrained against relative movement when the stem is seated in said circular groove.

7. A fishing bobber adapted to run freely on a fishing line comprising in combination: a buoyant body portion and a ball clutch, said buoyant body portion having an axial bore and a socket with a circular groove in the lower portion thereof surrounding the upper end of said axial bore, said ball clutch consisting of a ball having a diametrical bore; a tubular stem slidably mounted in said ball bore, said stem having a laterally extending annular flange and a rounded lower end portion; a spring in said ball bore surrounding said tubular stem; and a ring nut threadably engaging said ball so as to aline said stem in said diametrical bore, said spring being seated under compression between said ring nut and said flange and said ball clutch being retained within said socket in said body portion for ball-and-socket movement therein, to be movable by a force applied laterally through the line from an angling position to cause said tubular stem to be displaced from a vertical position and said lower rounded end portion of said tubular stem to lodge in said circular groove so as to bind said bobber on said line, and to be movable by a predetermined tension in the line exerted between points above and below the bobber to cause said lower rounded end portion of said tubular stem to be dislodged from said circular groove and said tubular stem to be returned to a vertical position so as to free said bobber to move on said line.

KENNETH C. SIMPSON.

REFERENCES CITED

The following references are of record in the file of this patent:

UNITED STATES PATENTS

| Number | Name | Date |
|---|---|---|
| 878,362 | Denning | Feb. 4, 1908 |
| 1,122,359 | Bissett | Dec. 29, 1914 |
| 2,052,262 | Walberg | Aug. 25, 1936 |
| 2,316,074 | Kimbrough | Apr. 6, 1943 |